Patented Sept. 13, 1938

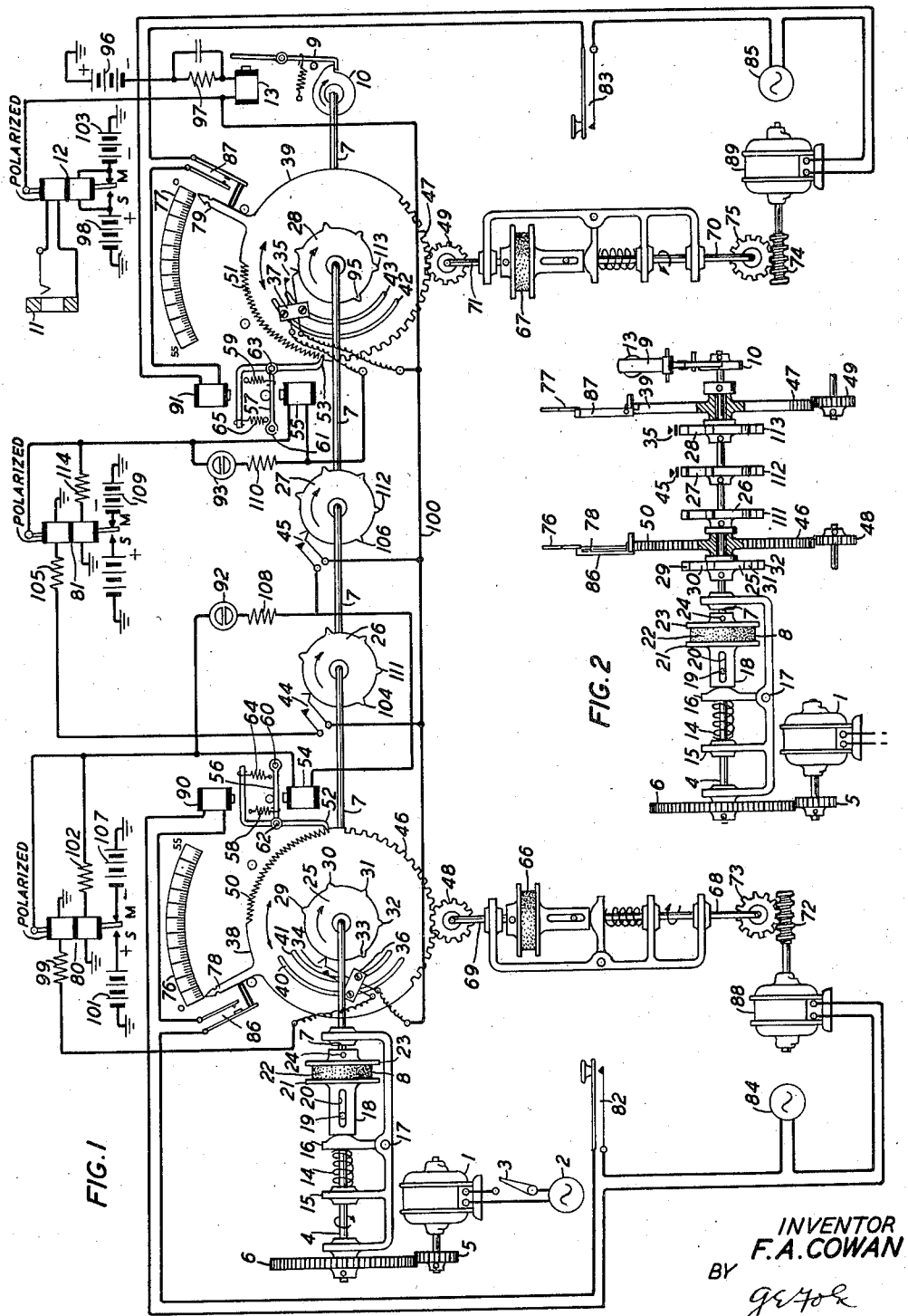

2,129,823

UNITED STATES PATENT OFFICE 2,129,823

DISTORTION INDICATING AND MEASURING DEVICE

Frank Augustus Cowan, New York, N. Y., assignor to American Telephone and Telegraph Company, a corporation of New York Application October 29, 1936, Serial No. 108,311

5 Claims. (Cl. 178—69)

This invention relates to telegraph apparatus and more particularly to apparatus for measuring signal distortion in a telegraph system.

An object of the invention is to determine the percentage of distortion present in incoming signals without the necessity of examining the transmitted text.

According to the present invention, distortion may be measured by orientation methods, that is, the determination of the amount of distortion present in incoming signals may be measured directly by orienting means and without the necessity of knowing anything regarding the text of the message that is being transmitted. The arrangement is provided with a start-stop rotating cam assembly responsive to incoming signals and arranged, when rotating, to successively close a series of contact sets for each impulse of an incoming signal combination. The first contact set closes during the revolution of the cam assembly at a time corresponding to that when the advanced or front end of an incoming undistorted signal impulse is being received. In like manner, second and third contact sets correspond to the middle of the impulse and the last or fourth contact set corresponds to the rear end of the impulse. The operation of the second and third contacts sets normally occurs simultaneously. In the arrangement set forth herein, the cam assembly is designed for 421 revolutions per minute and accordingly provides for the closing of the contact sets for each successive 55 degree of angular rotation up to a total of 275 degrees. By retarding or advancing a magnetically operated stop latch the orientation of the four contact sets could be changed with respect to time by common amounts. Two of the contact sets are also equipped with means for rotating with respect to the cam assembly so that the operation of each of the two contact sets may be advanced or retarded independently of the others. The object of the invention may be accomplished by employing neon lamps or meters to indicate that the distortion is in excess of a certain value. The cycle of operation of the contact sets may be repeated for each selecting impulse of the start-stop code, or 55 degree rotation of the cam assembly. If the first contact set of the series is retarded to about the same position as the second contact set and the last contact set is advanced to about the same position as the third contact set, there will be no flashing of the neon lamps or indications on the meters, no matter what happens to the signal. Likewise it can be shown that for the condition of undistorted incoming signals (barring, of course, imperfections in the measuring equipment) the first contact set may be advanced 27½ degrees and the last contact set retarded 27½ degrees and still there will be no flashing. For the condition of 10 per cent distortion on either end of one of the impulses, the first and fourth contact sets would need to be moved 5.5 per cent nearer the second and third sets, respectively, to prevent flashing. It will be seen that the amount which it is necessary to change the orientation of the first and last contact sets to prevent flashing of the neon lamp, or the indications on the meters, is an indication of the amount of distortion present. In conjunction with the operation of the neon lamps, or meters, the windings of two stepping devices are employed whereby the devices are stepped to indicate a percentage when the distortion exceeds a certain value. By a suitable mechanical connection, one of the stepping devices may be connected to the first contact set of the series and in such a manner that each step will result in retarding the first contact set and likewise the other stepping device may be connected to the last contact set in such a manner that each step will result in advancing the last contact set. The advantage of this automatic arrangement is that by connecting the measuring circuit to a line circuit to be tested and waiting a suitable length of time, preferably a minute, a reading will be obtained without any wait on the part of the observer thereby eliminating any possibility of error in judgment or observation.

The objects and advantages of the invention will be better understood from the following description when read in connection with the accompanying drawing in which Figure 1 is a schematic illustration of an arrangement of the invention which uses a self-adjusting stepping device to obtain a reading of maximum distortion. The various cams, the stepping discs and the driving gears for the discs, are shown, for purposes of illustration, turned horizontally 90 degrees from the plane of rotation in which they are driven by the shafts on which they are mounted.

Figure 2 is a partial view of the arrangement of Figure 1, which shows the aforesaid cams, discs and gears as actually mounted on the driving shafts.

Referring to Figure 1, a motor 1 is provided which operates from an electric power source 2 when switch 3 is closed. Motor 1 rotates shaft 4 by means of pinion 5 and spur wheel 6, which latter is rigidly mounted on shaft 4. Main shaft 7 is coupled through friction coupling 8 to driving shaft 4, but does not revolve while latch 9 engages an associated projection on cam 10, rigidly secured to shaft 7. To measure the distortion on a working telegraph line, not shown, said line should be patched into jack 11, which is connected with line relay 12 which responds in unison with the start-stop telegraphic impulses being transmitted over the line. On the initial spacing start impulse relay 12 operates to its spacing contacts and energizes start magnet 13, which moves latch 9 from its normal engagement with the associated projection of cam 10. Shaft 7 accordingly revolves being driven by shaft 4 through the friction clutch 8, the faces of which are held in engagement by the action of the helical spring 14, one end of which is in contact with the bearing pillar 15 and the other end of which rests against the vertical arm 16, which is free to move around the pin 17. The pressure of spring 14 against the left surface of arm 16 causes the right surface of arm 16 to bear against the end of sleeve 18 which is driven by shaft 4 through the pin 19 and the longitudinal slot 20. The sleeve 18 is free to slide along shaft 4 and the slot 20 along the pin 19. Clutch face 21 is accordingly pressed against the friction material 22 which is secured to clutch face 23, which in turn is pinned to shaft 7 by pin 24. The tension of spring 14 produces sufficient friction to drive shaft 7 without slipping, when latch 9 is disengaged. When latch 9 is engaged, shaft 7 is held stationary while clutch 8 slips.

On shaft 7 are rigidly mounted cams 25, 26, 27 and 28 and on each of these are projections, such as 29, 30, 31, 32 and 33 on cam 25. The angular distance between each of these projections should be approximately equal to the angular distance between the centers of the character distributor segments of a receiving teletypewriter or between the centers of the projections on the selector cam, if this type of construction is used. For the purpose of this description, this angular distance is assumed to be 55 degrees. When the cams 25 and 28 revolve, in the direction indicated by the arrows, contacts 34 and 35, respectively are momentarily closed by the engagement of the associated projections on the cams. Contacts 34 and 35 are mounted in blocks 36 and 37 of a suitable insulating material, which are secured by screws to the stepping plates 38 and 39 and may be adjustably positioned as required by being slid along the annular slots 40 and 41, and 42 and 43. Associated with cams 26 and 27 are contacts 44 and 45 which are permanently positioned so that they are closed approximately at the same time by their associated cam projections. Associated with cams 25 and 28 are the stepping plates 38 and 39, which are rotatably mounted on shaft 7 and are free to move around it in either direction. Stepping plates 38 and 39 are provided with spur teeth 46 and 47, respectively, which mesh with the teeth of the pinions 48 and 49, and are also provided with ratchet teeth 50 and 51, with which the pawls 52 and 53 are in engagement. When distortion is present on the telegraph line that is being tested, the magnets 54 and 55 are periodically energized in response to the functioning of relays 80 and 81 as will be hereinafter described and cause the armatures 56 and 57 to be moved downward against the tension of the retractile springs 58 and 59. Neon lamps 92 and 93 are connected in multiple with the windings of magnets 54 and 55, to give a visual indication of their operation. Armatures 56 and 57 are rotatably mounted on pivot bearings 60 and 61. Pawls 52 and 53 are rotatably linked with armatures 56 and 57 by pins 62 and 63 and are normally held engaged with ratchets 50 and 51 by the retractile springs 64 and 65. Each downward movement of armatures 56 and 57 causes the pawls 52 and 53 to step the plates 38 and 39, in a clockwise and counter-clockwise direction, respectively, against the friction of friction clutches 66 and 67, which are associated with shafts 68 and 69, and 70 and 71, respectively, as clutch 8 is associated with shafts 4 and 7. Shafts 68 and 70 are normally prevented from rotating by the irreversibility of the gears consisting of worms 72 and 74, and pinions 73 and 75. As plates 38 and 39 revolve, distortion is indicated on the graduated scales 76 and 77 by the pointers 78 and 79. Scales 76 and 77 are graduated in degrees from 0 to 55. In order to restore pointers 78 and 79 to zero after the maximum reading of distortion is indicated, switches 82 and 83 are closed thereby connecting current sources 84 and 85, respectively, in series with motors 88 and 89, off-normal contacts 86 and 87, and restoring magnets 90 and 91. Motors 88 and 89 operating drive the pinions 48 and 49 through the friction clutches 66 and 67 so as to restore plates 38 and 39 to their normal position, at which position the contacts 86 and 87 are opened.

A better visualization of the actual arrangement of the mechanical features of Figure 1 may be obtained from Figure 2. In Figure 2 the cams 25, 26, 27, 28, and 10, and the stepping plates 38 and 39 are shown in their true planar relation with respect to the shaft 7. Each detail of Figure 2 which corresponds to an identical detail of Figure 1 may be identified by identical reference letters. A more complete understanding of the invention may be obtained from the following discussion which traces in detail each feature of operation when the distortion on a working telegraph line is being measured.

Before measuring distortion pointers 78 and 79 should be set at zero and motor 1 should be started by means of switch 3. Shaft 4 is geared so that it revolves at approximately the same speed as that of the distributor or selector cam of the teletypewriter which is receiving the telegraphic impulses, which are to be measured for distortion. Contacts 34 should be positioned so that the angular distance between their point of contact with cam 25 and cam projection 33 should be 55 degrees, and contacts 35 should be positioned so that the angular distance between their point of contact with cam 28 and cam projection 95 should be 110°. These positions may be obtained by manually moving stepping discs 38 and 39 and thereby measuring the angular rotation of the contacts 34 and 35 is indicated by the pointers 78 and 79.

Let it be assumed now that the line to be tested is patched into jack 11, the conductors of which are connected to the upper winding of relay 12. On transmission of an initial start spacing impulse relay 12 operates to its spacing contacts due to the biasing effect of the current in its lower winding and closes a circuit traced from battery 96, through resistance 97, winding of start magnet 13 and spacing contacts of relay 12 to battery 98. Magnet 13 is energized and operates latch 9, thereby releasing cam 10. Shaft 7 is now free and revolves in the direction of the arrows, being driven through friction clutch 8 from shaft 4. After approximately 55 degrees of revolution, cam contacts 34 are closed momentarily by the projection 33. Let it be assumed now that the initial character impulse received over the line is a marking impulse. Relay 12 then operates to its marking contacts and closes a circuit from battery 103, marking contacts of relay 12, over conductor 100, through contacts 34, resistance 99 and upper winding of relay 80 to ground. The current in the circuit just traced is so directed that relay 80 remains locked to battery 107 from ground through its lower winding, resistance 102 and its marking contacts. After approximately 27½ degrees of additional rotary movement contacts 44 are closed by cam projection 104. A circuit is then momentarily closed from negative battery 103 on conductor 100, through contacts 44, resistance 105 and upper winding of relay 81 to ground. Relay 81 remains on its marking contacts, locked in a circuit traced from battery 109, through its marking contacts, resistance 114 and lower winding to ground. At approximately the same time that contacts 44 close, contacts 45 are momentarily closed by projection 106 on cam 27, completing a circuit from negative battery 107 through marking contacts of relay 80, winding of stepping magnet 54 and in multiple therewith neon lamp 92 and resistance 108, and contacts 45 to negative or marking battery 103 on conductor 100. No current flows in this circuit since the potential of negative battery 107 opposes that of negative battery 103. After an additional rotary movement of approximately 27½ degrees, contacts 35 are closed by cam projection 95 of cam 28. A circuit is now completed which is traceable from negative battery 109, marking contacts of relay 81, through winding of stepping magnet 55 and in multiple therewith neon lamp 93 and resistance 110, contacts 35 to negative battery 103, on conductor 100, it being assumed that relay 12 is still on its marking contacts—a condition of no distortion. No current flows in this circuit since the potential of negative battery 109 opposes that of negative battery 103.

The description above given covered a condition of no distortion, that is, it was assumed that the initial marking impulse arrived on time after the initial spacing impulse and that said marking impulse continued until the contacts 35 were closed after 55 degrees of rotation. As described in detail, stepping magnets 54 and 55 and lamps 92 and 93 were not energized. The functioning of the invention under a condition of distortion will now be described.

After the initial spacing impulse that results in the operation of relay 12 to its spacing contacts, followed by the energizing of start magnet 13 and the starting of shaft 7, let it be assumed that the beginning of the first character impulse—a marking impulse arrives late, that is, after the closing and subsequent opening of cam contacts 34. Under this condition relay 12 is on its spacing contacts and positive battery 98 is connected over the path traced before for negative battery 103. Relay 80 is energized through its upper winding and operates to its spacing contacts, if not already so operated. A locking circuit for relay 80 is closed from ground through its lower winding, resistance 102 and its spacing contacts to battery 101. After a rotation of approximately 27½ degrees following the closing of contacts 34, contacts 44 close and relay 81 operates and locks through its marking contacts, as before. The closing of contacts 44 is at a point corresponding to the approximate center of the incoming character impulse and accordingly the beginning of the delayed marking impulse must of necessity come before contacts 44 close. Relay 12 is thus operated to its marking contacts and closes a circuit for operating relay 81, as before traced. When contacts 45 close a circuit is momentarily closed from positive battery 101 through spacing contacts of relay 80, winding of stepping magnet 54 in multiple with neon lamp 92 and resistances 108, contacts 45 to negative battery 103 on conductor 100. Magnet 54 is energized and lamp 92 flashes. Magnet 54 attracts armature 56 and causes pawl 52 to step disc 38 and contacts 34 thereon, around in a clockwise direction. When contacts 45 open after their momentary closing magnet 54 releases armature 56 and pawl 52 then engages the next tooth in the ratchet 50 in preparation for the next step. Let it be assumed now that in addition to distortion at the beginning of the marking impulse that distortion occurs also at the end of the impulse, that is, that the impulse ends before contacts 35 close to indicate thereby the close of the standard character element period. Accordingly, since relay 12 changes prematurely from marking to spacing, when contacts 35 close momentarily after 55 degrees of rotation due to the action of cam projection 95, a circuit is closed from positive battery 98 on conductor 100 through contacts 35, winding of stepping magnet 55 in multiple with lamp 93 and resistance 110, and marking contacts of relay 81 to negative battery 109. Magnet 55 is energized and neon lamp 93 flashes indicating distortion. Magnet 55 attracts armature 57, thereby imparting by means of pawl 53 a counter-clockwise rotation to disc 39 and contacts 35 mounted thereon. After contacts 35 open, magnet 55 releases and pawl 53 engages the next tooth of ratchet 51.

In the description before given the discussion covered the functioning of the apparatus for the first closing of the cam contacts 34, 44, 45 and 35 after the initial starting space impulse was received, that is, the action for the first character element was described. For the second character element contacts 34, 44, 45 and 35 are closed by cam projections 32, 111, 112 and 113, respectively. Assuming that distortion is also associated with the beginning of the second impulse magnet 54 will be operated again and lamp 92 will flash, provided that contacts 34 in their new retarded position are still closed and opened before relay 12 changes from marking to spacing. Similarly, if there is distortion associated with the end of the second impulse magnet 55 will be operated again and lamp 93 will flash provided that contacts 35 in their new advanced position still close and open after relay 12 indicates a transition at the end of the second impulse. For the third, fourth and fifth impulses the four cam contacts are opened and closed as before, and contacts 34 will be retarded and contacts 35 advanced until a position is reached at which contacts 34 are closed and opened after relay 12 responds at the beginning of the character impulse and at which contacts 35 are closed and opened before relay 12 responds at the end of the impulse. Pointers 78 and 79 then indicate the maximum distortion for the first character in degrees on scales, 76 and 77, respectively. After the fifth element impulse is received the final stop or marking impulse is transmitted. Relay 12 is then operated to its marking contacts, connecting negative battery 103 to the circuit of stop magnet 13, which is accordingly deenergized. Latch 9 then engages the stop projection on cam 10 and shaft 7 stop, completing the revolution.

For the transmission of the impulses for the second and succeeding characters, the action is the same as that described for the first character and the distortion indicated on scales 76 and 77 will be gradually increased until a final maximum reading is obtained.

After the reading of maximum distortion has been obtained, pointer 78 may be restored to zero by manually operating switch 82 which closes a circuit that may be traced from current source 84 through switch 82, off-normal contacts 86, winding of release magnet 90 and motor 88 to source 84. Motor 88 now rotates shaft 68 through worm 72 and pinion 73. The rotation of shaft 68 is transmitted through friction clutch 66 to shaft 69 and thence through pinion 48 to the spur teeth 46. Disc 38 is now free to rotate in a counter-clockwise direction since magnet 58 being energized causes pawl 52 to move out of engagement with ratchet 50. This rotation continues until the off-normal contacts 86 open when pointer 78 reaches zero. To restore pointer 79 to zero switch 83 is closed operating motor 89 through the winding of release magnet 91 and off-normal contacts 87. Disc 39 is then rotated in a clockwise direction until pointer 79 reaches zero and contacts 87 are opened. In the drawing switches 82 and 83 are shown arranged for manual operation. It is to be understood, however, that these switches may be arranged for automatic operation, by a clock or some other suitable interrupting device, so that the apparatus may be restored to normal at the end of a convenient timed interval.

What is claimed is:

1. A signal distortion indicator comprising a source of signal impulses, a relay responsive to signal impulses from said source, a rotatable member and driving means therefor controlled by said relay and operating in substantial synchronism with the impulses received from said source, circuit closing means on said rotatable member, said member having certain of said circuit closing means equidistant from each other, a plurality of movable contact sets arranged in engageable relation with said certain means, circuits respectively controlled by said movable contact sets, relay devices connected with each of said circuits, and stepping indicating devices controlled by said relay devices arranged to operate in successive steps and lock in each stepped position until a point of maximum distortion is attained only when distortion in excess of a certain value is present in the signals received from said source.

2. A signal distortion indicator in accordance with claim 1, wherein the rotatable member comprises means arranged to be intermittently controlled by said relay, and said movable contact sets comprise means whereby said movable contact sets may be moved independently of each other to indicate the amount and location of distortion present in the signals received from said source.

3. In a signaling system, a source of incoming signal impulses of the start-stop code received in groups and a device for measuring the distortion in said signaling impulses comprising a rotary timing device normally locked, a source of energy for driving said timing device, a relay device for releasing said locked timing device in response to the first signal impulse of each group to thereby drive said timing device through one revolution only during the time when a group of undistorted signal impulses is being received, sets of contacts on said timing device respectively arranged to close at the beginning, the middle, and the end of each undistorted signal impulse of a group, there being two sets cooperating with the middle portion of each signal impulse, a pair of stepping devices respectively associated with those of said contact sets that are operable at the beginning and ending of each signal impulse, and indicating means associated with each of said stepping devices for indicating when the beginning, middle and ending of each received signal impulse differs in time relation with the successive closures of said contact sets.

4. In a signaling system, a source of incoming signal impulses of the start-stop code received in groups and a device for measuring distortion in said signaling impulses in accordance with claim 3, wherein the indicating means controlled at either the beginning or ending of each signal impulse comprises a flashing element and an arcuate scale arranged to cooperate with one of said stepping devices.

5. In a signaling system, a source of incoming signal impulses of the start-stop code received in groups and a device for measuring distortion in said signaling impulses in accordance with claim 3, wherein the timing device comprises a rotatable shaft and four rotatable discs fixedly mounted thereon, each of said discs having at their respective peripheries five projections corresponding to the five selecting impulses of the start-stop code received from said signaling source and separated from each other by the angular distance between the centers of the selecting impulses, namely 55 degrees, the projection on each of said discs being in coaxial alignment with their corresponding projections on the other discs, and wherein said contact sets are arranged with respect to each other as follows, the first set on the first disc in normal position being positioned in advance to its first projection an angular distance of 55 degrees, the second and third sets on their respective second and third discs in normal positions being positioned in advance to their respective first projections an angular distance of 82½ degrees and the fourth set on the fourth disc in normal position being positioned in advance to its first projection an angular distance of 110 degrees.

FRANK AUGUSTUS COWAN.